US009876749B2

(12) United States Patent
Kerr et al.

(10) Patent No.: US 9,876,749 B2
(45) Date of Patent: Jan. 23, 2018

(54) DYNAMIC LOCATION-SPECIFIC DISTRIBUTION LISTS

(75) Inventors: Jim M. Kerr, Seattle, WA (US); Alan D. Gatzke, Bainbridge Island, WA (US); Cary A. Bran, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1177 days.

(21) Appl. No.: 11/612,037

(22) Filed: Dec. 18, 2006

(65) Prior Publication Data

US 2008/0148276 A1 Jun. 19, 2008

(51) Int. Cl.
*H04L 12/58* (2006.01)
*H04L 29/08* (2006.01)
*G06Q 10/10* (2012.01)
*H04W 4/02* (2009.01)

(52) U.S. Cl.
CPC ........... *H04L 51/28* (2013.01); *G06Q 10/107* (2013.01); *H04L 67/18* (2013.01); *H04W 4/02* (2013.01)

(58) Field of Classification Search
CPC ....... H04L 51/28; H04L 67/18; G06Q 10/107; H04W 4/02
See application file for complete search history.

(56) References Cited

U.S. PATENT DOCUMENTS

| | | | | | |
|---|---|---|---|---|---|
| 5,548,816 | A | * | 8/1996 | DeVaney | H04W 60/04 455/456.2 |
| 5,563,881 | A | * | 10/1996 | Perelman | H04L 51/28 370/428 |
| 5,761,415 | A | * | 6/1998 | Joseph | G06Q 10/107 379/93.24 |
| 5,875,441 | A | * | 2/1999 | Nakatsuyama | G06F 17/30929 |
| 5,990,886 | A | * | 11/1999 | Serdy | G06Q 10/107 707/999.004 |
| 6,034,692 | A | * | 3/2000 | Gallery | G06F 3/04815 345/427 |
| 6,502,112 | B1 | * | 12/2002 | Baisley | G06F 17/2211 707/999.202 |
| 6,545,596 | B1 | | 4/2003 | Moon | |
| 6,553,425 | B1 | * | 4/2003 | Shah | G06Q 10/107 709/206 |
| 6,636,240 | B1 | | 10/2003 | Centerwall et al. | |
| 6,754,335 | B1 | | 6/2004 | Shaffer | |
| 6,760,751 | B1 | * | 7/2004 | Hachiya | G06Q 10/107 709/206 |
| 7,172,113 | B2 | * | 2/2007 | Olenick | G07F 17/26 235/380 |
| 7,376,431 | B2 | * | 5/2008 | Niedermeyer | G06Q 20/04 379/114.14 |
| 7,644,144 | B1 | * | 1/2010 | Horvitz | G06Q 10/10 709/203 |
| 7,769,611 | B1 | * | 8/2010 | Rodriguez | G06Q 10/02 705/7.11 |

(Continued)

*Primary Examiner* — Jung Kim
*Assistant Examiner* — James J Wilcox
(74) *Attorney, Agent, or Firm* — P. Su (57) ABSTRACT

In one embodiment, an apparatus comprises a first interface arrangement that obtains information from at least one data source. The information is associated with the presence of an entity at a location. The apparatus also comprises a processing arrangement that automatically updates a dynamic distribution list that is associated with the location based on the information.

4 Claims, 7 Drawing Sheets

(56) References Cited

U.S. PATENT DOCUMENTS

| | | | | |
|---|---|---|---|---|
| 8,064,487 B1* | 11/2011 | Armstrong | H04M 3/42365 | 370/259 |
| 8,504,619 B1* | 8/2013 | de Waal | H04L 51/20 | 709/206 |
| 8,510,472 B1* | 8/2013 | Anderson | H04L 51/20 | 709/206 |
| 2002/0099775 A1* | 7/2002 | Gupta | G06Q 10/107 | 709/205 |
| 2002/0099777 A1* | 7/2002 | Gupta | G06F 17/241 | 709/206 |
| 2003/0081115 A1* | 5/2003 | Curry | H04M 3/56 | 348/14.12 |
| 2003/0110114 A1* | 6/2003 | Dmochowski | G06Q 10/10 | 705/36 R |
| 2003/0182379 A1* | 9/2003 | Henry | H04L 51/28 | 709/206 |
| 2003/0195787 A1* | 10/2003 | Brunk | G06Q 10/06311 | 705/7.13 |
| 2003/0212680 A1* | 11/2003 | Bates | G06Q 10/109 | |
| 2004/0049696 A1* | 3/2004 | Baker | G06Q 10/107 | 726/1 |
| 2004/0087300 A1* | 5/2004 | Lewis | H04L 45/04 | 455/412.2 |
| 2005/0009537 A1* | 1/2005 | Crocker | H04L 29/06 | 455/456.3 |
| 2005/0027779 A1* | 2/2005 | Schinner | G06Q 10/107 | 709/200 |
| 2005/0027803 A1* | 2/2005 | Kelley | H04L 51/30 | 709/206 |
| 2005/0091323 A1* | 4/2005 | Smith | G06Q 10/107 | 709/206 |
| 2006/0031303 A1* | 2/2006 | Pang | H04L 51/12 | 709/206 |
| 2006/0048070 A1* | 3/2006 | Taylor | G06Q 30/06 | 715/773 |
| 2006/0143278 A1* | 6/2006 | Bauchot | G06Q 10/107 | 709/206 |
| 2006/0233334 A1* | 10/2006 | Bingaman | G06Q 30/04 | 379/126 |
| 2007/0050455 A1* | 3/2007 | Yach | G06Q 10/109 | 709/206 |
| 2007/0050456 A1* | 3/2007 | Vuong | H04L 51/28 | 709/206 |
| 2007/0180033 A1* | 8/2007 | Singh | G06Q 10/107 | 709/206 |
| 2007/0233785 A1* | 10/2007 | Abraham | G06Q 10/107 | 709/204 |
| 2007/0255789 A1* | 11/2007 | Buchheit | G06Q 10/107 | 709/206 |
| 2007/0294390 A1* | 12/2007 | Willey | G06Q 10/107 | 709/224 |
| 2008/0027960 A1* | 1/2008 | Fulgham | G06Q 10/107 | |
| 2008/0040432 A1* | 2/2008 | Murphy | G06Q 10/107 | 709/206 |
| 2008/0104075 A1* | 5/2008 | Heumesser | G06Q 10/107 | |
| 2010/0161333 A1* | 6/2010 | Maas | G10L 15/197 | 704/251 |
| 2016/0255487 A1* | 9/2016 | Abu-Hakima | H04L 12/1845 | |

* cited by examiner

DYNAMIC LOCATION-SPECIFIC DISTRIBUTION LISTS

BACKGROUND OF THE INVENTION

Distribution, or mailing, lists are often used to quickly propagate e-mail messages. A distribution list that includes a plurality of e-mail addresses may be created such that by entering a name of the distribution list as a destination for a message, the message may be sent to all e-mail addresses included in the distribution list. The use of a distribution list is generally more efficient than having to manually obtain and enter a series of e-mail addresses to which a message is to be sent. Distribution lists are often location-based, or geography-specific. Location-based distribution lists may refer to geographic regions, buildings, and floors of buildings. Typically, location-based distribution lists are manually populated, e.g., by a system administrator of an organization or by individuals who create the location-based distribution lists, and manually updated. Hence, each time an entity associated with a location-based distribution list is either be associated with or disassociated from the location-based distribution list, the association or disassociation is manually processed.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

A dynamic distribution list that is location-based may be updated substantially each time an entity either enters a location or exits a location. The location that entity enters or exits may either be physical, e.g., a conference room, or virtual, e.g., a virtual private network (VPN). Automatically populating a location-based distribution list based on the entities that are currently at a particular location allows the location-based distribution list to remain up-to-date or current. As such, when a location-based distribution list that is current is used to propagate a message to all entities currently associated with a location, the message will generally be sent to all the entities that should receive the message. Further, because the location-based distribution list is current, the message is not sent to any entities that were previously, but are no longer, at the location.

Figure 1:
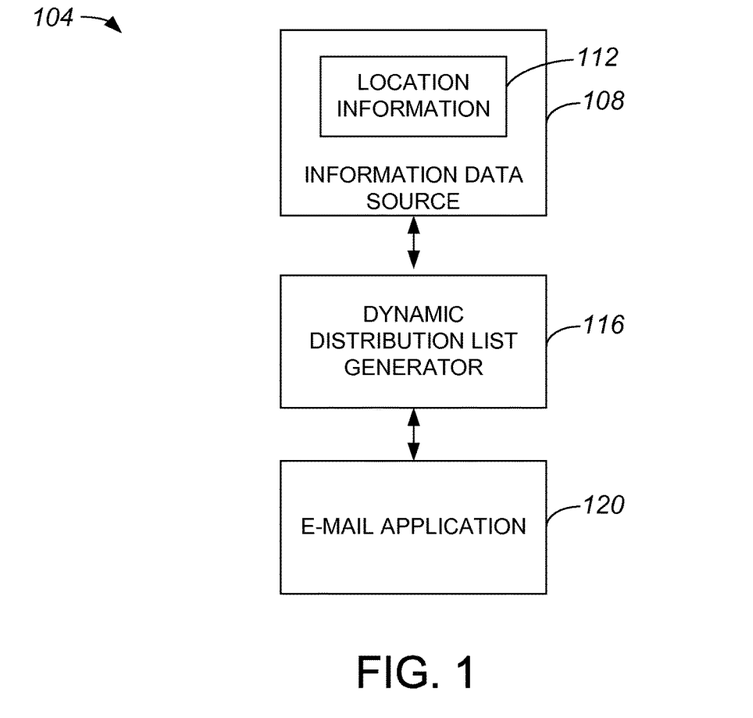
FIG. 1 illustrates an example system for dynamic location-specific distribution lists.

Dynamic distribution lists may be generated by a dynamic distribution list generator and provided to applications for use. Referring initially to FIG. 1, a system in which a dynamic distribution list generator interfaces with an information data source and an e-mail application will be described in accordance with an embodiment of the present invention. A system 104, which may be a network system, includes a dynamic distribution list generator 116 that is in communication with an information data source 108 and an e-mail application 120. Dynamic distribution list generator 116, which may include program code devices that allow distribution lists to be created and maintained, utilizes location information 112 collected by information data source 108 to generate distribution lists. The distribution lists that are generated and maintained by dynamic distribution list generator 116 are provided to e-mail application 120.

Information data source 108 may gather location information 112 from a variety of different sources. In one embodiment, information data source 108 may include a database (not shown) that stores location information 112. Location information 112 may include, but is not limited to, information associated with the location of a laptop computer, information associated with the location of a telephone, and information associated with the location of an individual.

Figure 2:
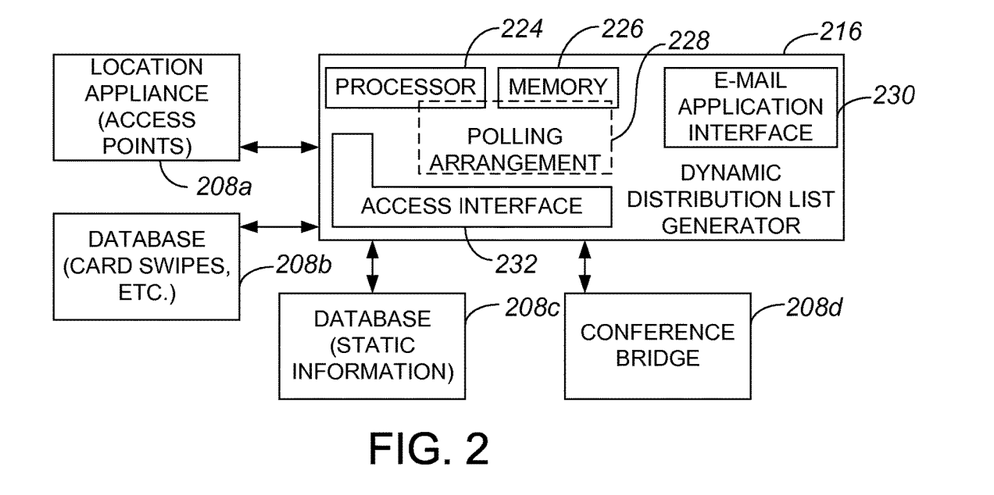
FIG. 2 illustrates an example dynamic distribution list generator and example types of data sources accessible to the dynamic distribution list generator.

Different types of information data sources may provide location information to a dynamic distribution list generator. FIG. 2 illustrates an example dynamic distribution list generator and example types of data sources accessible to the dynamic distribution list generator. A dynamic distribution list generator 216 is in contact with information data sources 208a-d. A first information data source 208a may be a location appliance such as the Cisco Wireless Location Appliance, available commercially from Cisco Systems, Inc. of San Jose, Calif. That is, first information data source 208a may be a device that detects when an entity such as a computing device registers with or otherwise communicates with access points or VPN gateways which are associated with first information data source 208a. Alternatively, first information data source 208a may be an access point or a device associated with a VPN.

A second information data source 208b may be a database that contains dynamic or transient information associated with an entity. In one embodiment, second information data source 208b may be a database associated with a badge reader that reads information stored on a data strip, e.g., a magnetic strip or a bar code strip, of an identification (ID) badge that is swiped therethrough or passed thereover. A third data source 208c may contain static information, or information that may generally be considered to be somewhat fixed. Static information may include, for example, directory information such as information that pertains to office locations and telephone jack locations. A distribution list may also be generated by dynamic distribution list generator 216 based on entities which call into a conference call. Hence, a fourth data source 208b may be associated with a conference bridge.

Dynamic distribution list generator 216 may include a processor 224 and a memory 226 that cooperate to allow information gathered from data sources 208a-d to be used to create a distribution list. Once created, a distribution list may be stored in memory 226. A polling arrangement 228 allows information to be obtained from data sources 208a-d. An access interface 232, which may be an application programming interface (API), allows dynamic distribution list generator 216 to access data sources 208a-d. Dynamic distribution list generator 216 also includes an e-mail interface 230 that allow dynamic distribution list generator 216 to access an e-mail system (not shown), e.g., a directory of an e-mail system. Through e-mail interface 230, dynamic distribution list generator 216 may export a distribution list to an e-mail system (not shown).

Figure 3A:
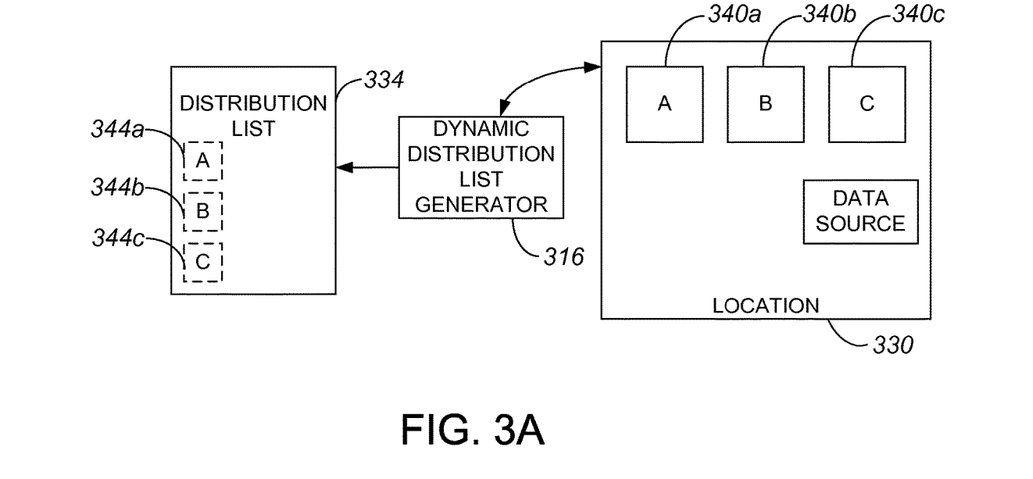
FIG. 3A illustrates an example dynamic distribution list associated with a location at a first given time.

FIG. 3A illustrates an example dynamic distribution list associated with a location at a first given time. A dynamic distribution list generator 316 is in communication with a location 330. That is, dynamic distribution list generator 316 is arranged to communicate with a data source, e.g., a location appliance or an access point, associated with location 330 to identify entities 340a-c which are present at location 330. The presence of entities 340a-c at location 330 may generally include physical presence and/or virtual presence, e.g., presence via a VPN or a conference call. Further, location 330 may either be a physical location or a virtual location.

Once dynamic distribution list generator 316 identifies entities 340a-c as being present at location 330, dynamic distribution list generator may generate a distribution list 334 that includes identifiers 344a-c which correspond to entities 340a-c, respectively. Identifiers 344a-c may generally include substantially any identifiers which allow entities 340a-c, respectively, to be identified. In one embodiment, identifiers 344a-c are e-mail addresses.

Figure 3B:
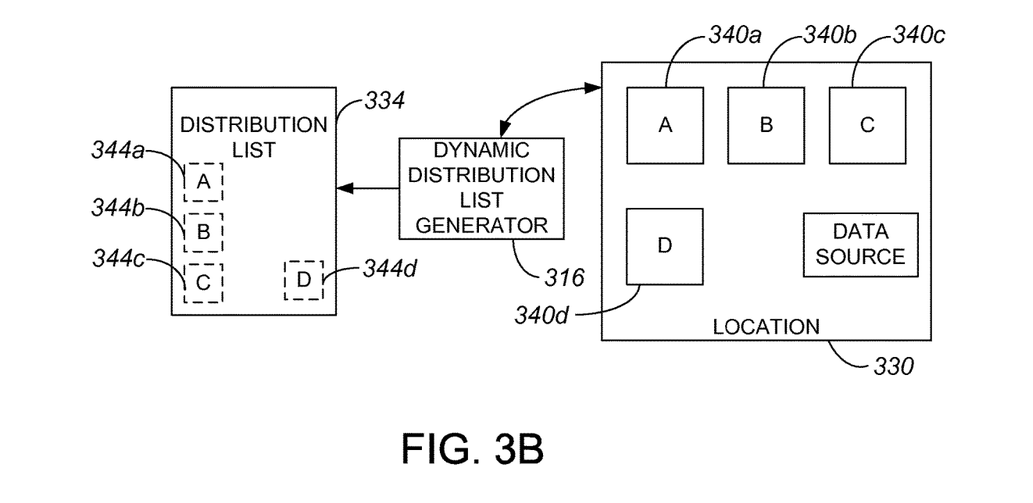
FIG. 3B illustrates an example dynamic distribution list associated with a location, e.g., dynamic distribution list 334 of FIG. 3A, at a second given time.

Distribution list 334 is updated in response to entities being added to or removed from location 330. As shown in FIG. 3B, when an entity 340d enters or is otherwise added to location 330, an identifier 344d that identifies entity 340d is added to distribution list 334 by dynamic distribution list generator 316. The addition of identifier 344d to distribution list 334 may occur at substantially any time after entity 340d is detected or registered at location 330.

Figure 3C:
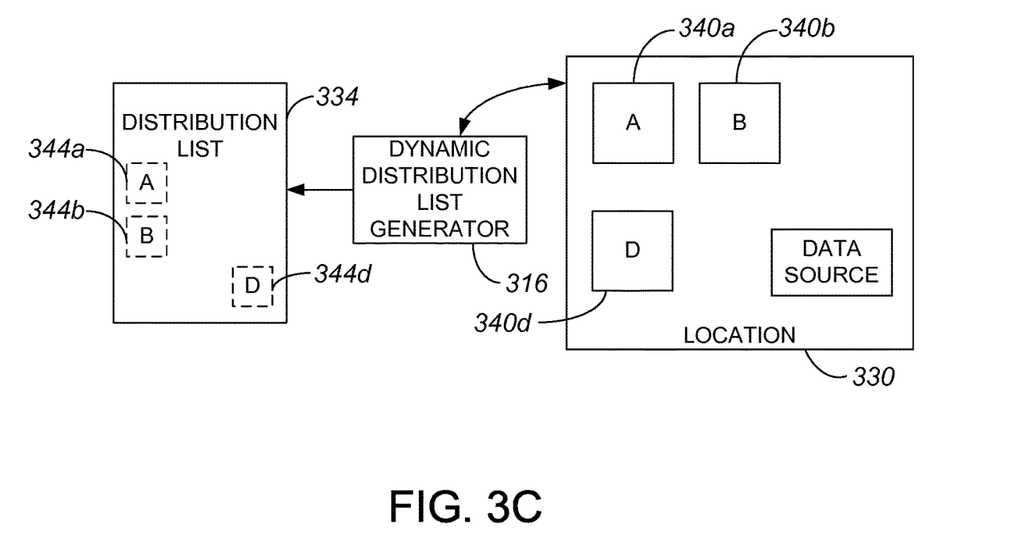
FIG. 3C illustrates an example dynamic distribution list associated with a location, e.g., dynamic distribution list 334 of FIGS. 3A and 3B, at a third given time.
Figure 4:
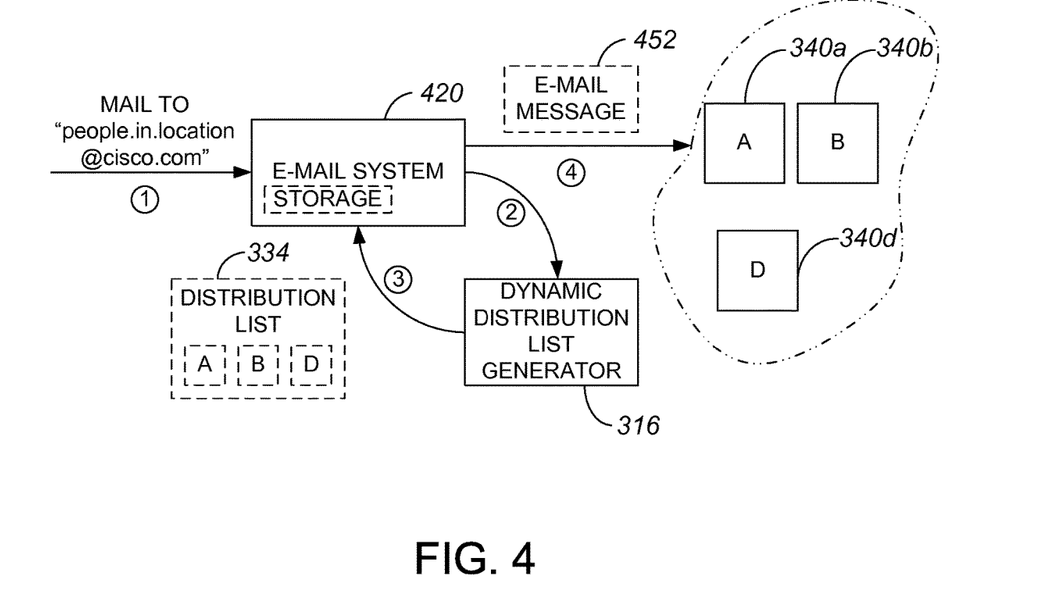
FIG. 4 illustrates an example process for sending an e-mail using a dynamic distribution list, e.g., dynamic distribution list 334 of FIG. 3C.

Similarly, an identifier 344a-d may be removed from distribution list 334 at substantially any time after an entity 340a-d is deregistered from location 330. Once entity 340c, for example, is no longer present in location 330, dynamic distribution list generator 316 may remove identifier 344c from distribution list 334. FIG. 3C illustrates an example dynamic distribution list associated with a location, e.g., dynamic distribution list 334 of FIGS. 3A and 3B, at a third given time. As shown, location 330 includes entities 340a, 340b, 340d. Hence, distribution list 334 includes identifiers 344a, 344b, 344d. Distribution list 334 may be associated with a descriptive list name that identifies location 330, e.g., "people.in.location@cisco.com." Hence, when a user sends an e-mail message to the name associated with distribution list 334, the e-mail message is sent to each entity identified in distribution list 334. With reference to FIG. 4, a process of sending an e-mail message using a distribution list, as for example distribution list 334 of FIG. 3C, will be described in accordance with an embodiment of the present invention. An e-mail system 420 may be used to broadcast or send a message to all entities associated with a location which, in the described embodiment, is location 330 of FIG. 3C. Location 330 may be identified by a name "people.in.location@cisco.com," although it should be understood that the name used to identify location 330 may be substantially any name.

Once "people.in.location@cisco.com" is provided as a destination address list to e-mail system 420, e-mail system 420 may interface with dynamic distribution list generator 316 to effectively obtain the most up-to-date version of distribution list 334. It should be appreciated that "people.in.location@cisco.com" may be specified as a destination address when a user (not shown) provides e-mail system with information that is to be sent, e.g., to entities 340a, 340b, 340d associated with "people.in.location@cisco.com,"

Distribution list 334 identifies entities 340a, 340b, 340d as being associated with "people.in.location@cisco.com," and is effectively provided to e-mail system 420 by dynamic distribution list generator 316. Once e-mail system 420 has access to distribution list 334, e-mail system 420 sends the information provided by a user (not shown) in an e-mail message 452 to the entities associated with "people.in.location@cisco.com," e.g., entities 340a, 340b, 340d. In one embodiment, e-mail system 420 may store distribution list 334.

As distribution list 334 is dynamic, each time e-mail system 420 is to be used to send a message to "people.in.location@cisco.com," the entities to which the message is sent may vary. In other words, the entities associated with "people.in.location@cisco.com," may vary substantially each time "people.in.location@cisco.com" is specified as a destination address list for a message. Alternatively, if the entities present in location 330 of FIG. 3C remain unchanged for an amount of time, the entities associated with "people.in.location@cisco.com," may remain essentially the same for that amount of time.

Figure 5A:
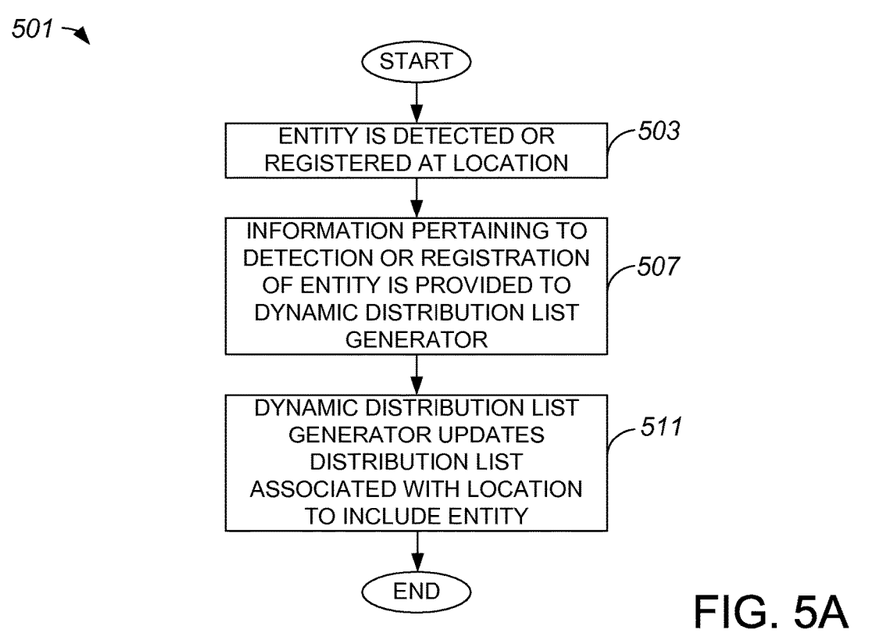
FIG. 5A illustrates an example method for processing the detection or registration of an entity at a location.
Figure 5B:
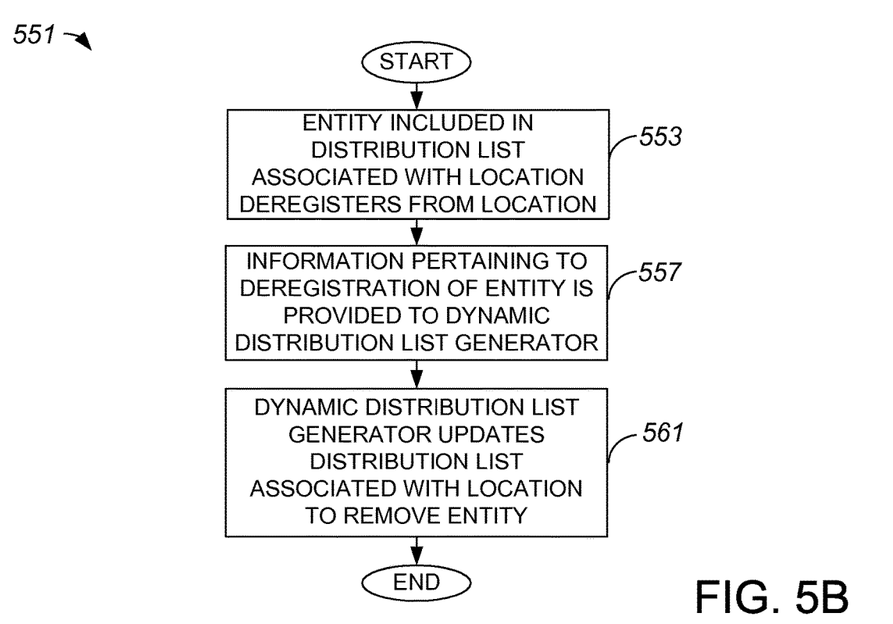
FIG. 5B illustrates an example method for processing the deregistration of an entity at a location.

When there is a change in the status of a location, e.g., when an entity either enters or leaves a location, a dynamic distribution list generator may update a dynamic distribution list to reflect the change in the status of the location in different manners. For instance, a distribution list may be updated substantially immediately after a change in the status of the location is detected, or a distribution list may be updated when the distribution list is requested. With reference to FIGS. 5A and 5B, the substantially immediate updating of a distribution list after a change in the status of a location is detected will be described, while the updating of a distribution list when the distribution list is requested will be described with respect to FIGS. 6A and 6B.

FIG. 5A illustrates an example method for processing the detection or registration of an entity at a location. A method 501 of processing an entity begins at step 503 in which an entity is detected or registers at a location. The entity may be a device such as laptop computer or a cell phone, or an individual with an ID badge. Detecting the presence of an entity at a location may include, but is not limited to, determining when the entity accesses an access point or a wifi at the location, or determining when an ID badge of the entity is swiped in a badge reader at the location. In one embodiment, the entity may be associated with a VPN or conferencing system that accesses the location, in which case detecting the virtual presence of the entity at the location may include querying a conference bridge. Further, the location itself may be virtual, in which case substantially all entities at the location have a virtual presence.

Once the entity is detected or registered at the location, information pertaining to the detection or registration of the entity is obtained and provided to a dynamic distribution list generator in step 507. Using the information pertaining to the entity, the dynamic distribution list generator updates a distribution list associated with the location in step 511. Updating the distribution list includes effectively including the entity in the distribution list, e.g., an e-mail address associated with the entity may be added to the distribution list. After the distribution list is updated to effectively include the entity, the processing of an entity is completed.

Referring next to FIG. 5B, one method of processing an entity that leaves a location will be described in accordance with an embodiment of the present invention. A method 551 of processing an entity begins at step 553 in which an entity which is identified in a distribution list associated with a location deregisters from the location, or otherwise is no longer detected as being at the location. An entity may be considered as being deregistered from a location, for example, when an access point or a wifi point no longer detects the presence of the entity, or when an ID badge of an entity that is identified in the distribution list for the location is swiped in a badge reader at a different location.

After the entity included in the distribution list is deregistered from the location, information pertaining to the deregistering of the entity is provided in step 557 to a dynamic distribution list generator. Then, in step 561, the dynamic distribution list generator updates the distribution list associated with the location by effectively removing the entity from the distribution list. In one embodiment, removing the entity from the distribution list includes removing an e-mail address of the entity from the distribution list. Removing the entity from the distribution list may instead involve regenerating a distribution list that excludes any reference to the entity. Once the entity is effectively removed from the distribution list, the processing of an entity is completed.

Figure 6A:
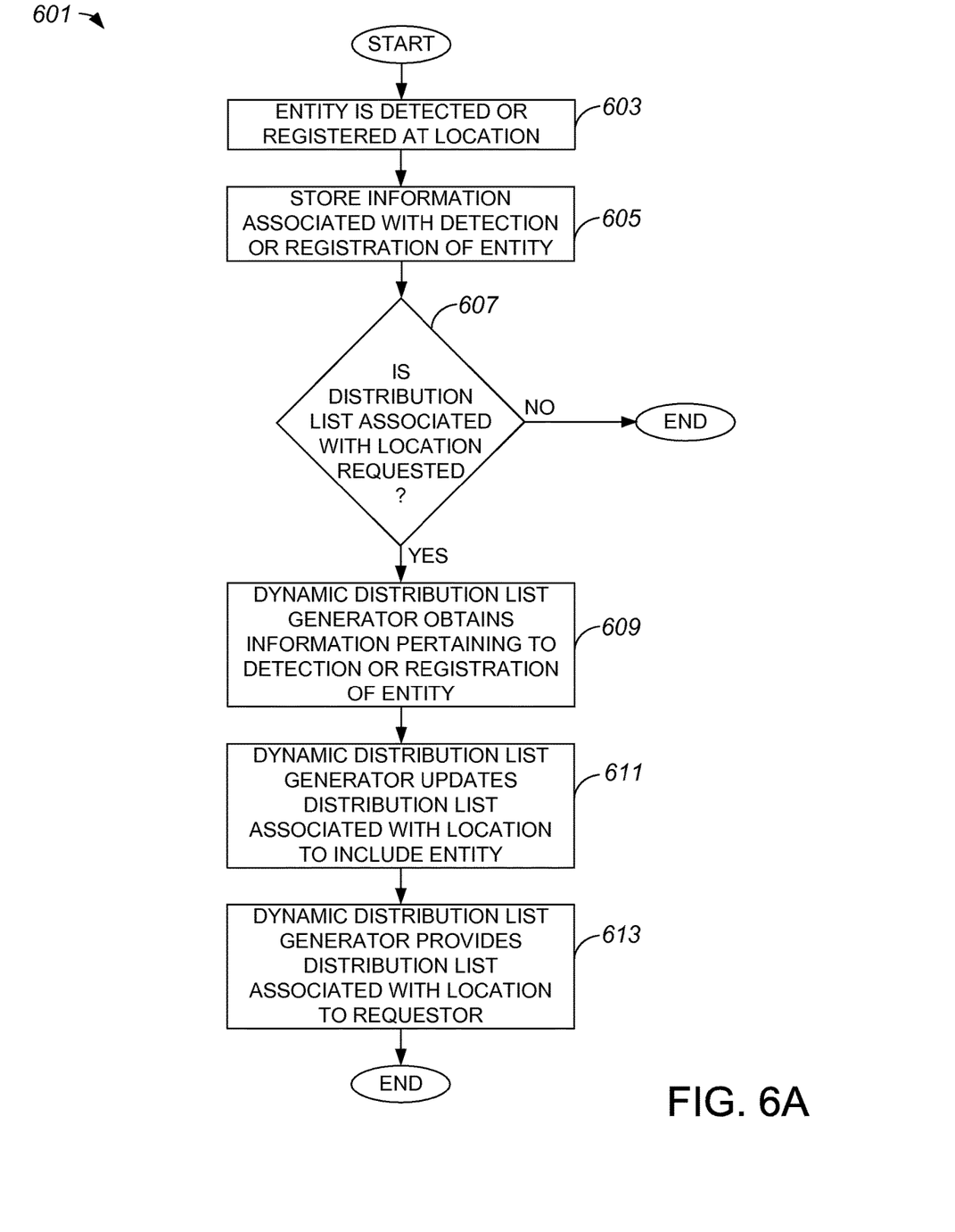
FIG. 6A illustrates another example method for processing the detection or registration of an entity at a location.

As previously mentioned, in lieu of substantially automatically updating a distribution list when an entity either registers at a location or deregisters with the location, a dynamic distribution list generator may be arranged to update a distribution list on demand. That is, a distribution list may be updated substantially only when the distribution list is requested. FIG. 6A illustrates another example method for processing the detection or registration of an entity at a location. A method 601 of processing an entity begins at step 603 in which the entity is detected or registered at the location. Information pertaining to the detection or registration of the entity is stored in step 605. Storing the information may include storing the information in a data store associated with the location, or in memory associated with a dynamic distribution list generator.

Once the information pertaining to the detection or registration of the entity is stored, a determination is made in step 607 regarding whether a distribution list associated with the location is requested, e.g., by an e-mail application or system. In one embodiment, such a determination may be made by the dynamic distribution list generator. If the determination is that a distribution list associated with the location is not requested, the processing of an entity is effectively completed. It should be appreciated, however, that if the determination in step 607 is that a distribution list has not been requested, process flow may instead repeat step 607 until the distribution list is eventually requested.

Alternatively, if it is determined in step 607 that a distribution list associated with the location has been requested, then process flow proceeds to step 609 in which the dynamic distribution list generator obtains information pertaining to the detection or registration of the entity. The information may be obtained from the data store or the memory into which the information was stored in step 605.

After the dynamic distribution list generator obtains the information pertaining to the detection or the registration of the entity in step 609, the dynamic distribution list generator updates the distribution list associated with the location in step 611 to include the entity. The updated distribution list is then provided by the dynamic distribution list generator to a requestor in step 613, and the processing of an entity is completed.

Figure 6B:
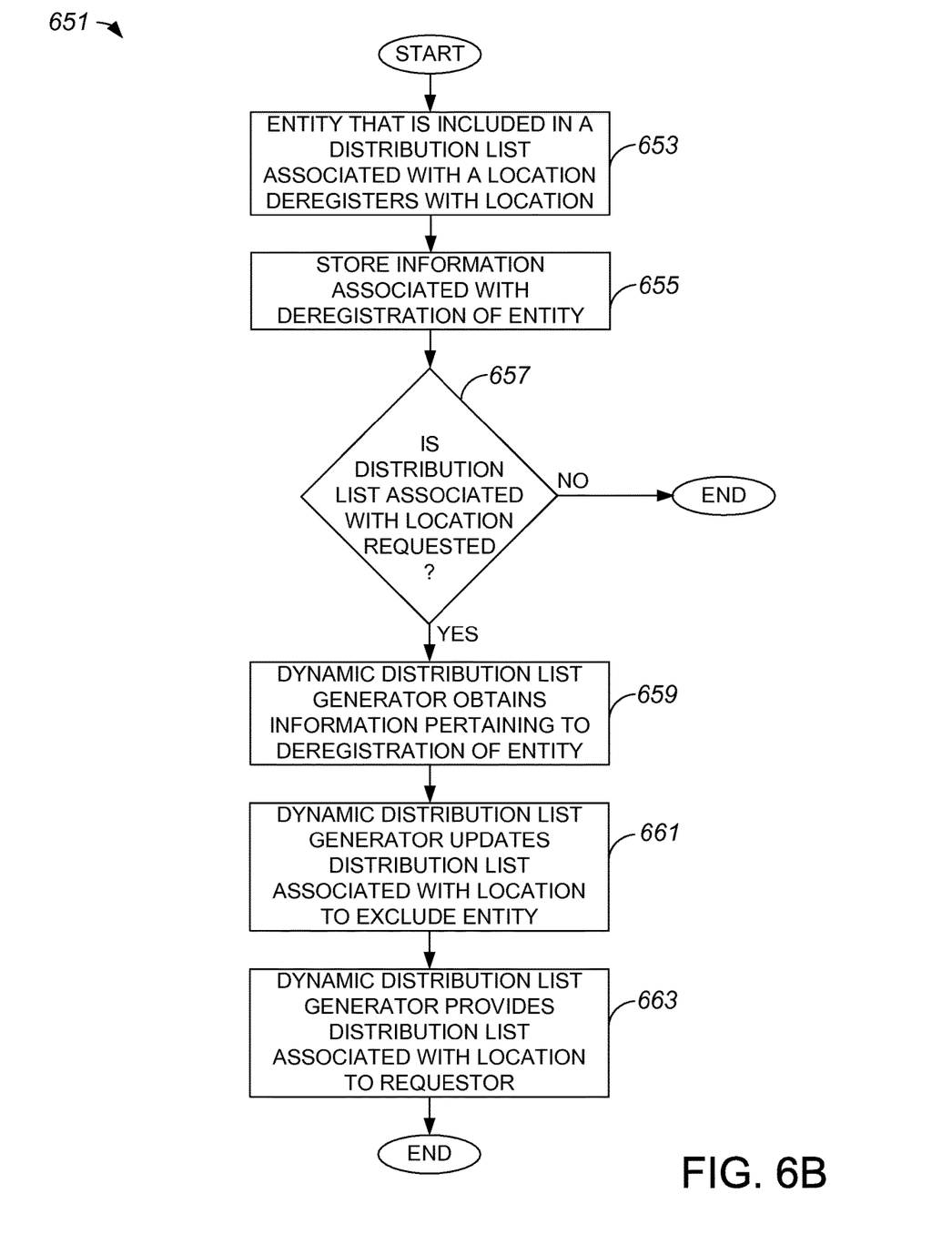
FIG. 6B illustrates another example method for processing the deregistration of an entity at a location.

FIG. 6B illustrates another example method for processing the deregistration of an entity at a location. A method 651 of processing an entity begins at step 653 in which the entity, which is included in a distribution list associated with a location, deregisters from the location. After the entity deregisters, or otherwise disassociates, from the location, information pertaining to the deregistration of the entity is stored in step 655.

A determination is made in step 657 regarding whether a distribution list associated with the location is requested. Such a determination may be made by a dynamic distribution list generator. In the described embodiment, the determination is that a distribution list associated with the location is not requested, the processing of an entity is effectively completed. However, it should be appreciated that if the determination in step 657 is that a distribution list has not been requested, process flow may instead repeat step 657 until the distribution list is eventually requested.

If the determination in step 657 is that a distribution list associated with the location has been requested, then the dynamic distribution list generator obtains information pertaining to the deregistration of the entity in step 659. Then, in step 661, the dynamic distribution list generator updates the distribution list associated with the location in step 661 to exclude the entity. After the distribution list is updated such that the entity is excluded from the list, the distribution list is provided to a requestor in step 663, and the processing of an entity is completed.

A dynamic distribution list generator may be arranged to generate and to maintain more than one distribution list associated with a particular location. By way of example, while a dynamic distribution list generator may generate a first distribution list which lists entities that are present at a location, if the dynamic distribution list generator is interfaced with a calendaring system, the dynamic distribution list generator may use calendaring information to generate a second distribution list which lists entities that are expected to be present at the location but are not actually present. In other words, a dynamic distribution list generator may cooperate with a calendaring system to generate more than one distribution list that is associated with a location.

Figure 7A:
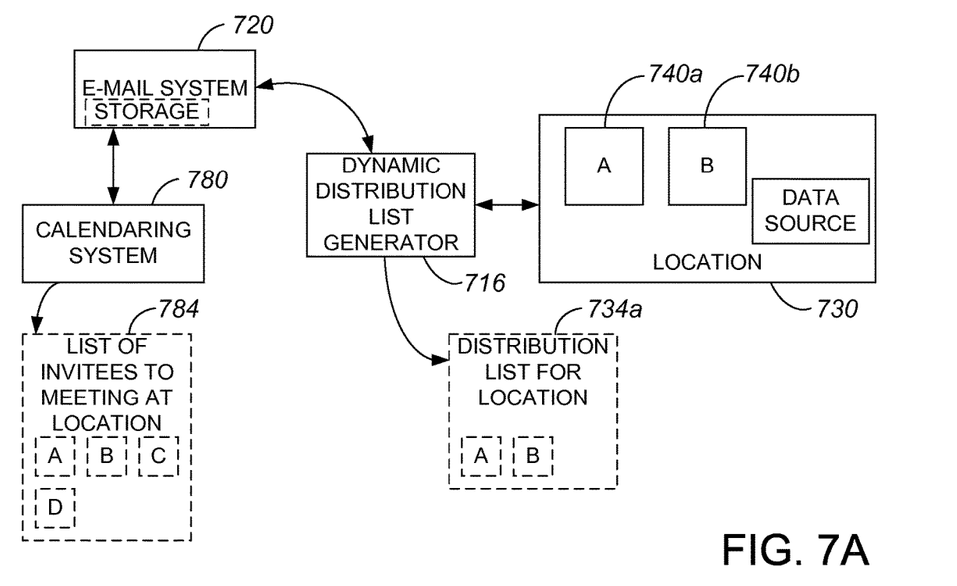
FIG. 7A illustrates an example dynamic distribution list generator that has access to information associated with a calendaring system.
Figure 7B:
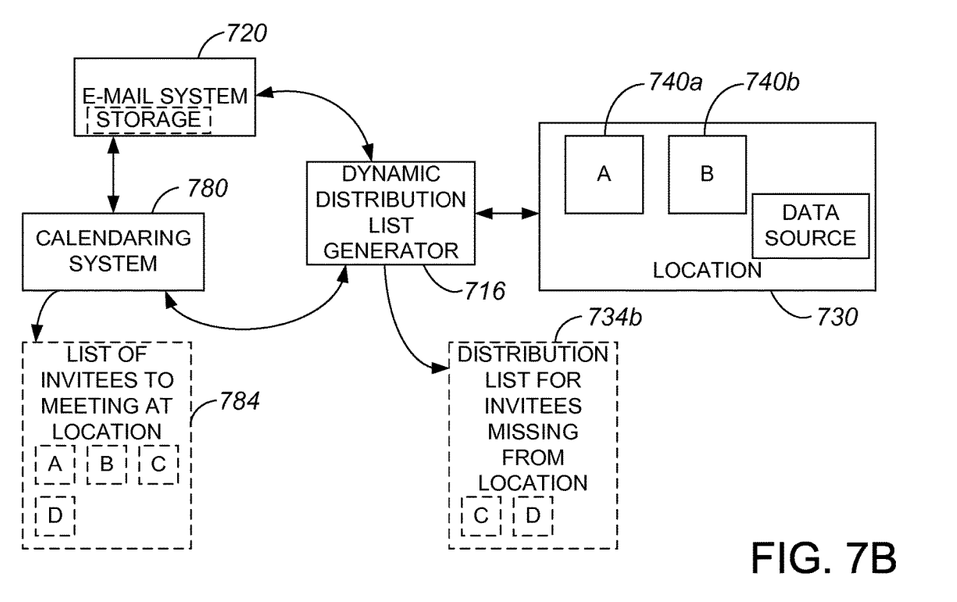
FIG. 7B illustrates another example dynamic distribution list generator that has access to information associated with a calendaring system, e.g., dynamic distribution list generator 716 and calendaring system 780 of FIG. 7A.

With reference to FIGS. 7A and 7B, a dynamic distribution list generator which has access to a calendaring system and may maintain more than one distribution list associated with a location will be described in accordance with an embodiment of the present invention. A dynamic distribution list generator 716 is arranged to generate a distribution list 734a that identifies entities 740a, 740b at a location 730, as shown in FIG. 7A. As previously mentioned, distribution list 734a may be generated by dynamic distribution list generator 716 using information associated with location 730. Dynamic distribution list generator 716 provides distribution list 734a to an e-mail system 720.

E-mail system 720 is associated with a calendaring system 780 that may be used to generate a list 784 of invitees to a meeting at location 730. As will be appreciated by those skilled in the art, calendaring system 780 may be used to organize meetings and to track invitees to meetings.

As shown in FIG. 7B, dynamic distribution list generator 716 may communicate with calendaring system 780 to obtain information regarding list 784. Given the information regarding list 784 and knowledge that entities 740a, 740b are present in location 730, dynamic distribution list generator 716 may generate a distribution list 734b which identifies invitees to a meeting in location 730 that are absent from location 730. Distribution list 734b may be provided to e-mail system 720 such that a message may be sent to all invitees who are not present at location 730.

Although only a few embodiments of the present invention have been described, it should be understood that the present invention may be embodied in many other specific forms without departing from the spirit or the scope of the present invention. By way of example, a dynamic distribution list has been described as being location-specific. However, a dynamic distribution list is not limited to being location-specific.

A first entity has been described as being added to a distribution list for a location if the first entity is either physically or virtually present at the location. In one embodiment, other entities that are associated with the first entity may also be added to the distribution list for the location if the first entity is present at the location. For example, if the first entity is a manager, in addition to adding the manager to the distribution list for the location, individuals who report to the manager may also be added to the distribution list for the location, whether the individuals are present at the location or not.

More than one distribution list may be updated in response to an entity either entering or exiting a location. For instance, if an individual is detected as being in or conferenced into "conference room A" in "building X," an identifier for the individual may be added to both a distribution list for "conference room A" and a distribution list for "building X." More generally, when a "child" distribution list is dynamically updated, a corresponding "parent" distribution list may also be dynamically updated.

While dynamically generated distribution lists have generally been described as being used by e-mail applications, dynamically generated distribution lists are not limited to being used by e-mail applications. A dynamically generated distribution list may be used by substantially any application in which a list of entities associated with a given location is needed. For example, a dynamically generated distribution list may be used to identify entities to which services or goods are to be provided, or entities to which a paper-mailing is to be distributed. In addition, a dynamically generated distribution list may list telephone numbers to which automated telephone calls are to be made.

An access interface that is a part of a dynamic distribution list generator may allow the dynamic distribution list generator to interface with data sources such as location appliances. It should be appreciated, however, that an interface that allows a dynamic distribution list generator to interface with data sources instead may be incorporated in the data sources, or may be substantially independent modules.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. An apparatus comprising:
   a first arrangement, the first arrangement being arranged to automatically determine if a change in a status of a first entity with respect to a location has occurred, wherein the location is associated with a meeting to which a plurality of entities has been invited, wherein the first entity is one of the plurality of entities;
   a second arrangement, the second arrangement being arranged to update a first distribution list to reflect the change in the status of the first entity with respect to the location in response to a request for the first distribution list, wherein the first distribution list is associated with the location, the second arrangement further being arranged to maintain a second distribution list, the second distribution list being arranged to identify at least one entity of the plurality of entities that is absent from the location but has been invited to the meeting, the first distribution list being arranged to identify actual meeting attendees, the second distribution list being arranged to identify meeting invitees; and
   a third arrangement, the third arrangement being arranged to store the first distribution list, wherein the third arrangement includes a memory.

2. The apparatus of claim 1 wherein the change in the status of the entity is a detection of the entity at the location, and wherein the second arrangement is arranged to update the first distribution list to reflect the change in the status of the entity with respect to the location by adding a reference to the entity into the first distribution list, the location being a first location associated with a second location, the second arrangement further being arranged to identify a third distribution list that is a parent distribution list to the first distribution list and to update the third distribution list to reflect the change in the status of the entity with respect to the second location.

3. The apparatus of claim 1 wherein the change in the status of the entity is a deregistration of the entity from the location, and wherein the second arrangement is arranged to update the first distribution list to reflect the change in the status of the entity with respect to the location by excluding a reference to the entity from the first distribution list.

4. An apparatus comprising:
   a first interface arrangement, the first interface arrangement being arranged to obtain a request for a distribution list, the first interface arrangement further being arranged to obtain information from at least one data source in response to the request, the information being associated with the presence of an entity at a location;
   a processing arrangement, the processing arrangement including a processor, the processing arrangement being arranged to automatically update the distribution list based on the information, the distribution list being associated with the location, wherein the distribution list includes a plurality of e-mail addresses including an e-mail address associated with the entity; and
   a memory, the memory arranged to store the distribution list, wherein the distribution list is an existing distribution list that exists prior to the first interface arrangement obtaining the information from the at least one data source, and wherein the processing arrangement is arranged to automatically updating the existing distribution list based on the information, and wherein the entity is a manager, the manager having a plurality of individuals who report to the manager but are not present at the location, the distribution list being arranged to be automatically updated to include at least one e-mail address associated with the plurality of individuals.

* * * * *